Figure 1:
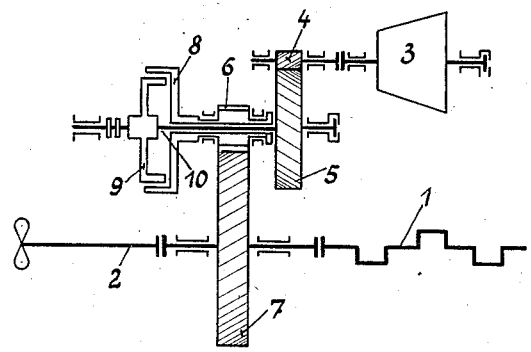

Jan. 21, 1941.　　　G. BAUER　　　2,229,544

POWER PLANT

Filed March 31, 1938　　　2 Sheets-Sheet 1

Inventor
Gustav Bauer

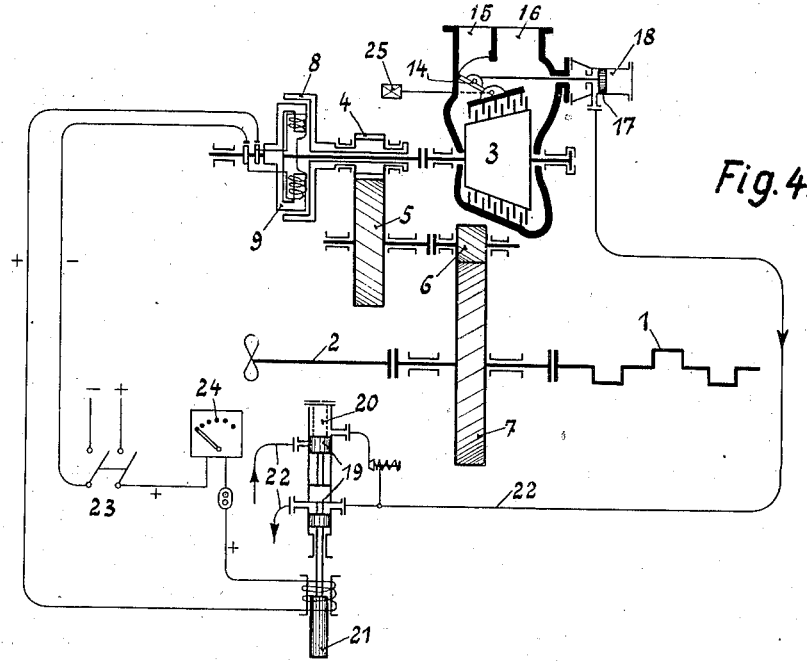
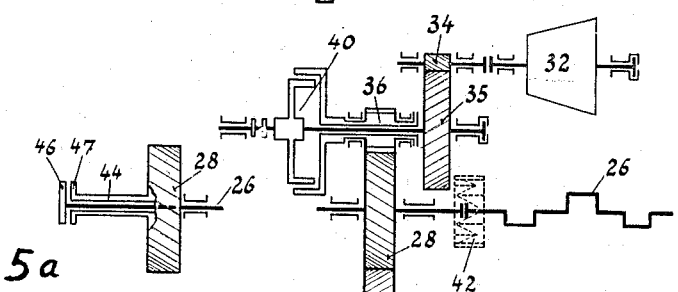
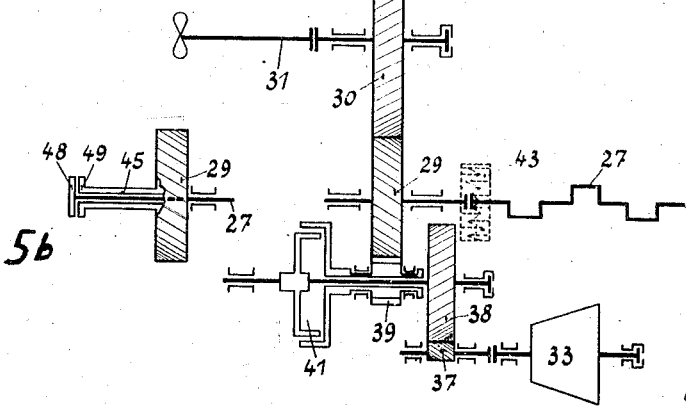

Patented Jan. 21, 1941

2,229,544

UNITED STATES PATENT OFFICE 2,229,544

POWER PLANT

Gustav Bauer, Hamburg, Germany

Application March 31, 1938, Serial No. 199,171
In France January 7, 1938

2 Claims. (Cl. 60—21)

In power plants, including marine plants, electricity has come into increasing use for auxiliary machine drive, control gear, steering machinery, lighting and so forth and the possibility exists of further utilising or extending the necessary generating and distributing plant. It has moreover been proposed to transform part of the output of an exhaust steam turbine serving for driving purposes into electrical energy for driving auxiliary machinery. The object of the present invention is to open up a new field of use for electrical energy in conjunction with an exhaust steam or exhaust gas turbine to effect equalisation between the uniformly rotating mass of the turbine having high kinetic energy and the non-uniformly working reciprocating engine, in a common drive of a shaft by the engine and turbine, in particular (but not exclusively) in a marine plant. For this purpose hitherto yielding or elastic mechanical couplings (e. g. spring couplings) or elastic intermediate members or hydraulic slip couplings have been used. The mechanical intermediate members have in general not come into use for want of sufficient endurance. The hydraulic slip couplings require additional pumps and complicated control devices. According to the invention these known intermediate members or couplings are replaced by an electromagnetic slip coupling, which has the advantage of great simplicity and forms a reliable smoothing device in the coupling together of reciprocating engine and turbine in the common drive of a shaft and in the avoidance of damage to the gearing through engine vibrations. For the sake of safety a control device can be provided which on failure of current in the coupling or when the engine is to work alone automatically sets the switch valve in the conduit from the engine to the turbine, to cut off the supply to the blading. The electromagnetic slip coupling can be incorporated at any convenient place in the gearing which connects the turbine shaft with the shaft driven by the reciprocating engine or it can be connected with the turbine or engine shaft. In marine plants in which the screw shaft is driven by two reciprocating engines through speed changing gears and by the exhaust turbines thereof, electromagnetic couplings could for example be incorporated in the turbine gears, and the shafts of the reciprocating engines or the transmission wheel keyed thereon be provided additionally with elastic intermediate members to hinder the transmission of vibrations from the engines to the gears.

The accompanying drawings diagrammatically illustrate some examples of marine plant embodying the invention.

Figs. 1 to 5, 5a and 5b each illustrates a modified arrangement of elements.

In Figures 1-4, 1 is the reciprocating engine shaft, 2 the screw shaft, 3 the exhaust steam or gas turbine, 4 the turbine pinion, 5 the large wheel of a first reduction stage, 6 and 7 the wheels of a second reduction stage.

Figure 2:
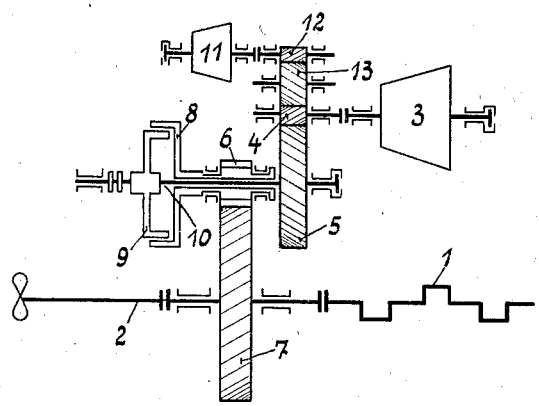
Figure 3:
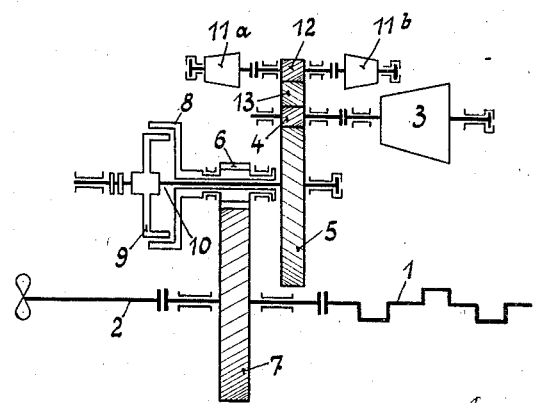

According to Figures 1 to 3 an electromagnetic coupling is arranged between the first and second reduction stages, of which the outer member 8 which may be the field magnet, is connected to the pinion 6 of the second reduction stage while the inner member 9 which may be the armature, is upon the shaft 10 of the large wheel of the first reduction stage, passing through the hollow pinion 6. With uniform rotation of the engine shaft 1 the coupling parts 8, 9 run with the constant relative speed. If variations occur in the rotation of the shaft 1, these manifest themselves as varying relative rotation (slip) of the one member with respect to the other, and are thus smoothed out or absorbed without affecting the turbine gears 4, 5. By the same means harmful vibrations emanating from the engine are also kept away from the gears 4, 5. The inertia of the coupling parts ensures smooth absorption of the torque variations within the gearing.

In Figure 1 a usual marine plant consisting of a reciprocating engine with exhaust steam or gas turbine for common drive of a screw shaft is shown. In the embodiment of Figure 2 the plant is supplemented by a live steam advance turbine 11, the gearing 12, 13 of which acts upon the pinion of the exhaust turbine 3. The electromagnetic coupling also protects these gears from damage by torque variations or vibrations emanating from the reciprocating engine.

Figure 3 corresponds to Figure 2 with the difference that the live steam turbine is divided into two parts 11a, 11b fed in opposite directions to balance the end thrust.

In the embodiment of Figure 4 the electromagnetic coupling is arranged on the shaft of the pinion 4 of the exhaust steam or gas turbine 3, that is it is constructed for a high speed and consequently has smaller dimensions and weight. Further, an example is shown of a device for automatically cutting out the turbine from the steam (or gas) path in the event of failure of the current or switching off of the coupling. For this purpose the switch valve 14 which connects the inlet 15 to the turbine either to the turbine blading or to the outlet 16 leading to the condenser (or exhaust pipe), is connected to the piston 17 of a fluid servo-motor 18 controlled by a slide valve 19 in the fluid flow and return pipes 22. The slide valve is on one hand under the pressure of a spring 20 and on the other attached to the armature or core of an electromagnet or solenoid 21 connected in the circuit of the electromagnetic coupling. 23 is the main switch and 24 a rheostat. Figure 4 shows the circuit broken and the switch valve 14 closed. In this position the spring 20 has forced the slide 19 connected with the core of the now unexcited solenoid downwards and thus opened the outlet for the release of pressure fluid from the pipe 22. The fluid pressure has thus been removed from the left hand side of the piston 17 so that the valve 14 has been brought to its closed position by the counterweight 25. If the coupling is switched on, the core 21 is drawn up into the solenoid so that the slide valve 19 is moved upwards against the pressure of spring 20 and thus re-opens the supply of pressure fluid to the pipe 22. The piston 17 is forced to the right, the valve 14 again opening the supply of steam (or gas) to the turbine blading. Obviously the control can be effected by any other suitable devices or in the simplest case by hand.

In the embodiment according to Figure 5 the shafts 26, 27 of two engines carry respective wheels 28, 29 meshing with a wheel 30 on the screw shaft 31 lying in the mid plane between the shafts 26, 27. The wheels 28, 29 are driven by exhaust steam or gas turbines 32, 33, one for each engine, through wheel gearing 34, 35, 36 and 37, 38 respectively. Electromagnetic couplings 40, 41 respectively are incorporated in this gearing in the same way as in Figures 1 to 3. In order to provide a further security in this plant against the transmission of torque variations or vibrations from the engine, it is advantageous either to incorporate an elastic coupling (for example a spring coupling) in each engine shaft, as indicated at 42, 43, or to carry the engine shafts through respective hollow shafts 44, 45 carrying the respective pinions 28, 29 and to couple the shafts yieldably or slidably at their ends as indicated respectively at 46, 47 Figure 5a and 48, 49 Figure 5b.

What I claim is:

1. A power plant for ship propulsion comprising a power shaft, a reciprocating engine for driving said shaft, an exhaust turbine, driving connections between said turbine and said power shaft, including an electromagnetic clutch having a field magnet and an armature closely juxtaposed thereto but spaced therefrom, whereby the two may rotate at substantially the same speed, but torque oscillations are not transmitted, a valve for controlling the supply of motive fluid to said turbine, and means for simultaneously operating said valve and controlling the energizing of said field magnet.

2. A power plant for ship propulsion comprising a power shaft, a reciprocating engine for driving said shaft, an exhaust turbine, driving connections between said turbine and said power shaft, including an electromagnetic clutch having a field magnet and an armature closely juxtaposed thereto but spaced therefrom, whereby the two may rotate at substantially the same speed, but torque oscillations are not transmitted, a valve for controlling the supply of motive fluid to said turbine, a servo-motor for operating said valve, a valve for controlling the motive fluid to said servo-motor, and a solenoid having a coil in series with said field magnet whereby upon shutting off current to the magnetic clutch the motive fluid to said turbine is simultaneously cut off.

GUSTAV BAUER.